(12) United States Patent
Koo et al.

(10) Patent No.: US 12,196,996 B2
(45) Date of Patent: Jan. 14, 2025

(54) OPTICAL FILM, POLARIZING PLATE INCLUDING SAME, AND DISPLAY DEVICE INCLUDING SAME

(71) Applicant: Samsung SDI Co., Ltd., Yongin-si (KR)

(72) Inventors: Jun Mo Koo, Suwon-si (KR); Jung Hun You, Suwon-si (KR); Sang Hum Lee, Suwon-si (KR); Dong Yoon Shin, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 989 days.

(21) Appl. No.: 17/253,523

(22) PCT Filed: Apr. 17, 2019

(86) PCT No.: PCT/KR2019/004611
§ 371 (c)(1),
(2) Date: Dec. 17, 2020

(87) PCT Pub. No.: WO2019/245145
PCT Pub. Date: Dec. 26, 2019

(65) Prior Publication Data
US 2021/0132278 A1    May 6, 2021

(30) Foreign Application Priority Data

Jun. 20, 2018    (KR) .................. 10-2018-0071103

(51) Int. Cl.
*B32B 23/08*    (2006.01)
*B32B 27/08*    (2006.01)
(Continued)

(52) U.S. Cl.
CPC ............ *G02B 5/3091* (2013.01); *B32B 23/08* (2013.01); *B32B 27/08* (2013.01); *B32B 27/36* (2013.01); *G02B 5/22* (2013.01)

(58) Field of Classification Search
CPC ...... G02B 5/3091; G02B 5/3083; G02B 5/22; G02B 5/208; G02B 1/18; B32B 23/08; B32B 27/08
See application file for complete search history.

(56) References Cited

U.S. PATENT DOCUMENTS 11,877,473 B2 *    1/2024   Fujita .................. G09F 9/00
2007/0285601 A1   12/2007   Hendrix et al.
(Continued)

FOREIGN PATENT DOCUMENTS

CN    1825188 A    8/2006
CN    101103305 A    1/2008
(Continued)

OTHER PUBLICATIONS

International Search Report of corresponding PCT/KR2019/004611, dated Apr. 17, 2019, 4 pages.
(Continued)

*Primary Examiner* — George G. King
*Assistant Examiner* — Anna Smith
(74) *Attorney, Agent, or Firm* — Lewis Roca Rothgerber Christie LLP

(57) ABSTRACT

Provided are an optical film, a polarizing plate including same, and a display device including same, the optical film comprising a first layer and second and third layers sequentially formed on the first layer, wherein the first layer and the third layer are each formed directly on the second layer, the first layer is a reverse wavelength dispersive negative A layer, the third layer is a positive C layer, and the ratio of the thickness of the second layer to the thickness of the third (Continued)

layer (the thickness of the second layer/the thickness of the third layer) is about 0.2 to about 2.

24 Claims, 1 Drawing Sheet

(51) Int. Cl.
  *B32B 27/36*  (2006.01)
  *G02B 5/22*  (2006.01)
  *G02B 5/30*  (2006.01)

(56) References Cited

U.S. PATENT DOCUMENTS

| | | | | |
|---|---|---|---|---|
| 2014/0185267 | A1* | 7/2014 | Kim | G02B 5/3083 349/194 |
| 2014/0293420 | A1* | 10/2014 | Ko | H10K 50/86 359/489.07 |
| 2014/0347613 | A1* | 11/2014 | Kim | H10K 50/858 313/112 |
| 2017/0261668 | A1* | 9/2017 | Hatano | G02B 27/281 |
| 2018/0095211 | A1* | 4/2018 | Lee | G02F 1/13363 |
| 2024/0027668 | A1* | 1/2024 | Lee | G02B 5/30 |

FOREIGN PATENT DOCUMENTS

| | | | |
|---|---|---|---|
| CN | 104076430 A | 10/2014 | |
| JP | 2006-520008 A | 8/2006 | |
| JP | 2009-80488 A | 4/2009 | |
| JP | 2010-235758 A | 10/2010 | |
| JP | 2016-224401 A | 12/2016 | |
| KR | 10-2005-0073221 A | 7/2005 | |
| KR | 10-2006-0008316 A | 1/2006 | |
| KR | 10-2013-0036918 A | 4/2013 | |
| KR | 10-1436441 B1 | 9/2014 | |
| KR | 10-2016-0006817 A | 1/2016 | |
| KR | 10-2017-0068861 A | 6/2017 | |
| KR | 10-2017-0117961 A | 10/2017 | |
| WO | WO 2017/002508 | 4/2018 | |
| WO | WO 2018/080138 A | 5/2018 | |
| WO | WO-2018101250 A1 * | 6/2018 | ............. B32B 27/08 |

OTHER PUBLICATIONS

Chinese Office action dated Dec. 31, 2021 issued in corresponding CN Application No. 201980041088.2, 9 pages.
Korean Office action dated Jan. 18, 2022 issued in corresponding KR Application No. 10-2018-0071103, 5 pages.

* cited by examiner

[FIG. 1]
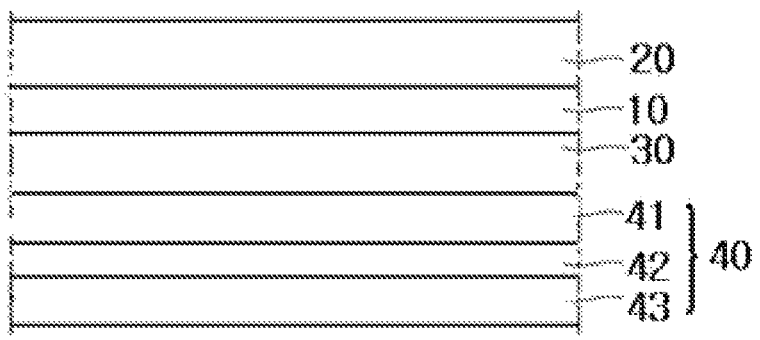
[FIG. 2]
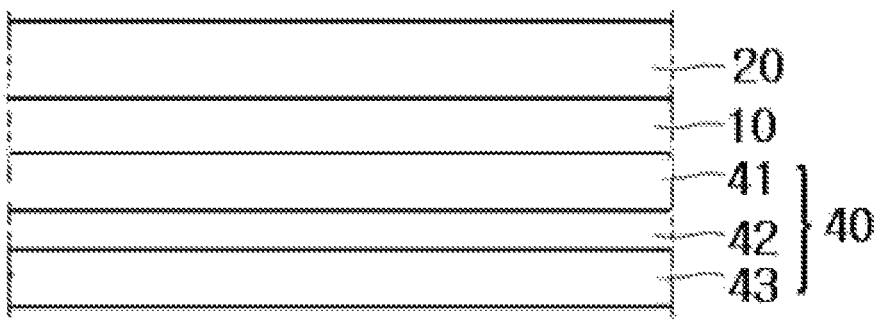

OPTICAL FILM, POLARIZING PLATE INCLUDING SAME, AND DISPLAY DEVICE INCLUDING SAME

CROSS-REFERENCE TO RELATED APPLICATIONS

This application is a U.S. National Phase Patent Application of International Application Number PCT/KR2019/004611, filed on Apr. 17, 2019, which claims priority to Korean Patent Application Number 10-2018-0071103, filed on Jun. 20, 2018, the entire contents of both of which are incorporated herein by reference.

TECHNICAL FIELD

The present invention relates to an optical film, a polarizing plate including the same, and a display apparatus including the same.

BACKGROUND ART

An organic light emitting display (OLED) is vulnerable to reflection of external light, causing a screen of the OLED to be invisible. To prevent this problem, an antireflection film is applied to the OLED. The antireflection film may be produced by combining two liquid crystal layers exhibiting positive dispersion via an adhesive agent or by combining a negative A plate exhibiting negative dispersion and a positive C plate via an adhesive agent. With two layers combined with each other, the antireflection film can undergo decrease in light transmittance due to interlayer interfacial reflection and can be increased in thickness due to the thickness of the adhesive layer. Although the liquid crystal layer may be formed by depositing a composition for liquid crystals, this method has problems of high price and difficulty in formation of a large-area liquid crystal layer due to a large number of defective pixels caused by failure in alignment of liquid crystals.

The background technique of the present invention is disclosed in Korean Patent Laid-open Publication No. 10-2016-0006817 and the like.

DISCLOSURE

Technical Problem

It is one object of the present invention to provide a multilayer optical film that can increase light transmittance through reduction in interlayer interfacial reflection and exhibits good interlayer adhesive strength.

It is another object of the present invention to provide a multilayer optical film that can improve an antireflection effect.

It is a further object of the present invention to provide a multilayer optical film that can achieve a slim thickness by eliminating an interlayer adhesive layer or bonding layer.

It is yet another object of the present invention to provide a multilayer optical film that can prevent panel damage by external light.

It is yet another object of the present invention to provide a polarizing plate and a display apparatus that include the optical film according to the present invention.

Technical Solution

In accordance with one aspect of the present invention, an optical film includes: a first layer; and second and third layers sequentially formed on the first layer, wherein each of the first layer and the third layer is directly formed on the second layer, the first layer being a negative dispersion negative A layer, the third layer being a positive C layer, and a thickness ratio of the second layer to the third layer (thickness of second layer/thickness of third layer) ranges from about 0.2 to about 2.

In one embodiment, the third layer may be a non-crystal layer.

In one embodiment, the second layer may be a non-adhesive layer, a non-bonding layer, or a non-adhesive bonding layer and may be formed through erosion of the first layer.

In one embodiment, the first layer and the second layer may include the same kind of polymer and may have at least one of a different alignment direction of polymers or a different alignment degree of polymers from one another.

In one embodiment, the first layer may have a higher alignment degree of polymers than the second layer.

In one embodiment, the first layer may include the polymers aligned in a mono-axial direction or in a bi-axial direction, and the second layer may include the polymers not in an aligned state.

In one embodiment, the first layer may have an in-plane retardation ratio (Re(450)/Re(550)) of about 0.7 to about 1.0, where Re(550) indicates an in-plane retardation at a wavelength of 550 nm and Re(450) indicates an in-plane retardation at a wavelength of 450 nm.

In one embodiment, the first layer may have an in-plane retardation Re (550) of about 110 nm to about 170 nm at a wavelength of 550 nm.

In one embodiment, the first layer may be formed of at least one selected from among a polycarbonate resin, a cyclic olefin polymer resin, a modified polycarbonate resin, an isosorbide resin, a cellulose resin, a fluorene resin, and a polyester resin.

In one embodiment, the first layer may have an in-plane retardation variation of about 5 nm or more, as represented by Equation 1:

$$\text{In-plane retardation variation} = |Re[0] - Re[1]| \quad \text{[Equation 1]}$$

Wherein Equation 1,

Re[0] is an in-plane retardation Re (unit: nm) of the first layer, as measured on a specimen having a size of 3 cm×3 cm×50 µm at a wavelength of 550 nm, and Re[1] is an in-plane retardation Re (unit: nm) of the first layer, as measured on the specimen at a wavelength of 550 nm after one drop of methylethylketone is added to the specimen at 25° C. and left for 1 hour.

In one embodiment, the third layer may include at least one selected from among a cellulose ester, a polymer thereof, and an aromatic polymer.

In one embodiment, the cellulose ester may include at least one selected from among cellulose acetate, cellulose acetate propionate, and cellulose acetate butyrate.

In one embodiment, the second layer may have a thickness of about 15 µm or less.

In one embodiment, the third layer may have a thickness of about 15 µm or less.

In one embodiment, a stack of the first layer and the second layer may be a negative dispersion negative A layer.

In one embodiment, a stack of the first layer and second layer may have an in-plane retardation Re(550) of 110 nm to 170 nm at a wavelength of 550 nm.

In one embodiment, a stack of the second layer and the third layer may be a positive C layer.

In one embodiment, assuming that a machine direction (MD) of the first layer is 0°, the first layer may have a slow axis in the range of about −5° to about 5° or about 40° to about 50° with respect to the (MD) of the first layer.

In one embodiment, the third layer may further include a UV absorbent having a maximum absorption wavelength of about 380 nm to about 420 nm.

In one embodiment, the UV absorbent may be present in an amount of about 0.1% by weight (wt %) to about 2 wt % in the third layer.

In one embodiment, the optical film may further include an adhesive layer, a bonding layer, or an adhesive bonding layer on an outermost surface thereof.

In accordance with another aspect of the present invention, a polarizing plate may include a polarizing film and the optical film according to the present invention formed on one surface of the polarizing film.

In one embodiment, the first layer, the second layer, and the third layer may be sequentially formed on the polarizing film.

In one embodiment, the polarizing plate may include a first protective layer, a polarizer, a second protective layer, the first layer, the second layer, and the third layer sequentially formed in the stated order.

In one embodiment, the polarizing plate may include a first protective layer, a polarizer, the first layer, the second layer, and the third layer sequentially formed in the stated order.

In accordance with another aspect of the present invention, a display apparatus may include the optical film or the polarizing plate according to the present invention.

Advantageous Effects

The present invention provides an optical film that can increase light transmittance through reduction in interlayer interfacial reflection and exhibits good interlayer adhesive strength.

The present invention provides an optical film that can improve an antireflection effect.

The present invention provides a multilayer optical film that can achieve a slim thickness by eliminating an interlayer adhesive layer or bonding layer.

The present invention provides a multilayer optical film that can prevent panel damage by external light.

The present invention provides a polarizing plate and a display apparatus that include the optical film according to the present invention.

BRIEF DESCRIPTION OF THE DRAWINGS

FIG. 1 is a sectional view of a polarizing plate according to one embodiment of the present invention.

FIG. 2 is a sectional view of a polarizing plate according to another embodiment of the present invention.

BEST MODE

Embodiments of the present invention will be described in detail with reference to the accompanying drawings to provide thorough understanding of the invention to those skilled in the art. It should be understood that the present invention may be embodied in different ways and is not limited to the following embodiments. In the drawings, portions irrelevant to the description will be omitted for clarity.

Herein, "in-plane retardation Re", "out-of-plane retardation (or retardation in thickness direction) Rth", and "degree of biaxiality NZ" are represented by Equations A, B and C, respectively:

$$Re = (nx - ny) \times d, \quad \text{[Equation A]}$$

$$Rth = ((nx + ny)/2 - nz) \times d, \quad \text{[Equation B]}$$

$$NZ = (nx - nz)/(nx - ny) \quad \text{[Equation C]}$$

wherein Equation A, Equation B and Equation C, nx, ny, nz are indexes of refraction of an optical device at a measurement wavelength in the slow-axis, fast-axis and thickness directions of the optical device, respectively, and d is the thickness of the optical device (unit: nm). The "optical device" may mean an optical film. The "optical device" may mean each of layers constituting the optical film, or a stack of the layers. The "measurement wavelength" may mean a wavelength of 450 nm, 550 nm, or 650 nm.

Herein, 'nx', 'ny', and 'nz' mean indexes of refraction of an optical device at a wavelength of 550 nm in the slow-axis, fast-axis and thickness directions thereof, respectively.

The inventors of the present invention sequentially or simultaneously formed a second layer and a third layer on a first layer by directly depositing a composition for the third layer capable of realizing a positive C retardation on one surface of a film for the first layer capable of realizing a negative dispersion negative A retardation and having low solvent resistance such that a thickness ratio of the second layer to the third layer ranges from about 0.2 to about 2. Through this process, the inventors could achieve a slim structure of the optical film and improvement in light transmittance through reduction in interlayer interfacial reflection and improvement in adhesive strength between the first layer and the third layer, and confirmed that, since the first layer of the optical film exhibits a negative dispersion negative A retardation and the third layer thereof exhibits a positive C retardation, the optical film could improve an antireflection effect by reducing reflectivity of a polarizing plate when stacked on a polarizing film, thereby completing the present invention.

Hereinafter, an optical film according to one embodiment of the present invention will be described in detail.

The optical film according to one embodiment of the invention includes a first layer; and second and third layers sequentially formed on the first layer, wherein each of the first layer and the third layer is directly formed on the second layer.

Herein, "directly formed on" means that another bonding layer, adhesive layer, or adhesive bonding layer is not interposed between the first layer and the second layer and between the second layer and the third layer. With the structure wherein the adhesive layer, the bonding layer, or the adhesive bonding layer is not formed between the first layer and the second layer and between the second layer and the third layer, the optical film can have a slim structure and can prevent interlayer interfacial reflection, thereby improving light transmittance of the optical film and a polarizing plate including a polarizing film and the optical film on one surface of the polarizing film. For example, the polarizing plate may have a light transmittance of about 42% or more, for example, about 42% to about 50%, or about 42% to about 45%.

In one embodiment, the optical film may have a thickness of about 1 μm to about 100 μm, for example, about 10 μm to about 70 μm. Within this thickness range, a polarizing plate including the same can have a slim structure.

In one embodiment, the optical film may have a light transmittance of about 90% or more, for example, about 95% to about 99.9%, in the visible range. Within this range, the optical film can improve an antireflection effect when used as an antireflection film.

As described below, when a composition for the third layer is directly coated on a surface of the first layer, the surface of the first layer is partially eroded by a solvent in the composition for the third layer, thereby allowing the second layer and the third layer to be sequentially and simultaneously formed on the first layer. Accordingly, as compared with the case where the first layer is attached to the third layer via an adhesive layer, adhesive strength between the first layer, the second layer and the third layer can be improved. In addition, the kind and/or content of the solvent may be controlled to allow the first layer and the third layer to secure phase retardation, as described above, thereby providing the antireflection effect. In the optical film according to the present invention, the first layer may be a solvent-eroding target layer.

Since the second layer is formed by eroding at least part of the surface of the first layer with the solvent contained in the composition for the third layer, the first layer has different features than the second layer, although the first layer comprises the same kind of polymer. For example, the first layer may be different from the second layer in terms of alignment direction of polymers, alignment degree of polymers, and the like. For example, the first layer may have a high degree of alignment of polymers, whereas the second layer may have a lower degree of alignment of polymers than the first layer due to solvent erosion of the polymers. For example, the first layer may include the polymers aligned in one axial direction or in a biaxial direction, whereas the second layer may be free from alignment of the polymers due to solvent erosion of the polymers. For example, the first layer does not include a material for the third layer, whereas the second layer may further include a material for the third layer.

In the optical film, a thickness ratio of the second layer to the third layer (thickness of the second layer/thickness of the third layer) may range from about 0.2 to about 2, preferably about 0.3 to about 0.8, more preferably about 0.4 to about 0.6. Within this range, the optical film has good adhesive strength between the first layer and the third layer, and the first layer can act as a negative dispersion negative A layer even when the first layer is eroded by depositing the composition for the third layer thereon. As described below, the above thickness ratio may be obtained by regulating solvent resistance of a film for the first layer, or the kind of solvent or the mixed ratio of the solvent contained in the composition for the third layer.

The first layer may become a negative dispersion negative A layer and the third layer may become a positive C layer. Despite the second layer being directly formed between the first layer and the third layer, the second layer does not affect phase retardation of the first layer. With the thickness ratio as set forth above, the first layer can act as the negative dispersion negative A layer.

The first layer may be a negative A layer that exhibits negative dispersion and satisfies a relation: nx≥ny≥nz.

Herein, "negative dispersion" may mean that the in-plane retardation ratio (Re(450)/Re(550)) of in-plane retardation Re(450) of the first layer at a wavelength of 450 nm to the in-plane retardation Re(550) thereof at a wavelength of 550 nm may range from about 0.7 to about 1.0. Preferably, the first layer has an in-plane retardation ratio (Re(450)/Re(550)) of about 0.7 to about 0.9, more preferably about 0.8 to about 0.9. Within this range, the first layer can improve the antireflection effect together with the third layer.

In addition, "negative dispersion" may mean that the in-plane retardation ratio (Re(650)/Re(550)) of in-plane retardation Re(650) of the first layer at a wavelength of 650 nm to in-plane retardation Re(550) thereof at a wavelength of 550 nm may range from about 1.0 to about 1.4, preferably about 1.0 to about 1.1. Within this range, the first layer can improve the antireflection effect together with the third layer.

The first layer may have an in-plane retardation Re(550) of about 110 nm to about 170 nm, preferably about 130 nm to about 155 nm, more preferably about 130 nm to about 140 nm, at a wavelength of 550 nm. Within this range, the first layer can improve the antireflection effect together with the third layer.

The first layer may have an out-of-plane retardation Rth of about 60 nm to about 100 nm, preferably about 70 nm to about 90 nm, at a wavelength of 550 nm. The first layer may have a degree of biaxiality NZ of about 0.6 to about 1.4, preferably about 0.8 to about 1.2, for example, about 0.95 to about 1.15, at a wavelength of 550 nm. Within this range, the optical film can further reduce reflectivity when stacked on a polarizing film.

The first layer may be a mono-axially or bi-axially stretched film or may include an inclined stretched film. In one embodiment, assuming that the MD (machine direction) of the first layer is 0°, an optical axis (slow axis of the first layer) may define an angle of about −5° to about 5°, or about 40° to about 50°, for example, about −5° to about 5°, or about 45±3° (about 42° to about 48°), with respect to the MD of the first layer. The first layer having an optical axis defining an angle of 0° with respect to the MD of the first layer means a film stretched in the MD of the first layer. The first layer having an optical axis defining an angle of about −5° to less than about 0°, greater than about 0° to about 5°, or about 40° to about 50° with respect to the MD of the first layer means an inclined stretched film. Within this range, the first layer can secure the antireflection effect of the optical film when combined with the third layer (positive C layer).

The first layer may have a thickness of about 10 μm to about 90 μm, preferably about 20 μm to about 70 μm, more preferably about 20 μm to about 60 μm. Within this range, the first layer can be used in the optical film and can secure a slim structure of the optical film.

The first layer may include a film formed of polymers that are likely to be dissolved and/or eroded upon contact with an organic solvent. In one embodiment, the first layer may have an in-plane retardation variation of about 5 nm or more, for example, about 20 nm to about 200 nm, or about 20 nm to about 150 nm, as represented by Equation 1:

$$\text{In-plane retardation variation} = |Re[0] - Re[1]| \quad \text{[Equation 1]}$$

Wherein Equation 1, $Re[0]$ is an in-plane retardation Re (unit: nm) of the first layer, as measured on a specimen having a size of 3 cm×3 cm×50 μm at a wavelength of 550 nm, and $Re[1]$ is an in-plane retardation Re (unit: nm) of the first layer, as measured on the specimen at a wavelength of 550 nm after one drop of methylethylketone is added to the specimen at 25° C. and left for 1 hour. Here, one drop may mean 0.001 ml to 10 ml, without being limited thereto.

In one embodiment, the first layer may be formed of at least one selected from among a polycarbonate resin, a cyclic olefin polymer resin, a modified polycarbonate resin, an isosorbide resin, a cellulose resin, a fluorene resin, and a polyester resin. Preferably, the first layer includes a film formed of a cellulose resin including a cellulose acylate resin and the like.

The optical film may further include an adhesive layer, a bonding layer, or an adhesive bonding layer formed on the other surface of the first layer, that is, on a surface of the first layer not directly contacting the second layer, to attach the optical film to an adherend, for example, a polarizer, a polarizing plate, or the like.

The third layer may be a positive C layer satisfying a relation: $nz>nx\approx ny$. With this structure, the third layer reacts with the first layer to secure the antireflection effect of the optical film.

The third layer may have an in-plane retardation of about 10 nm or less, preferably about 4 nm or less, at a wavelength of 550 nm. Within this range, the third layer can react with the first layer to secure the antireflection effect of the optical film.

The third layer may have an out-of-plane retardation Rth of about −30 nm to about −180 nm, preferably about −50 nm to about −150 nm, at a wavelength of 550 nm. Within this range, the optical film can exhibit a lateral antireflection effect.

The third layer may have a thickness of about 15 μm or less, preferably about 0.1 μm to about 8 μm, more preferably about 1 μm to about 6 μm. Within this range, the third layer can be used in the optical film and can secure a slim structure of the optical film.

The third layer may be a non-crystal layer.

The third layer may be formed of at least one selected from among a cellulose ester, a polymer thereof, and an aromatic polymer in consideration of solvent resistance of the first layer without affecting phase retardation of the first layer upon formation of the second layer. When the first layer is severely eroded by the composition for the third layer upon deposition of the composition for the third layer on the first layer, the first layer cannot act as a negative dispersion negative A layer, whereby the optical film cannot be used as an antireflection film. However, insignificant erosion of the first layer by the composition for the third layer can cause deterioration in adhesive strength between the first layer and the third layer. Thus, among various materials capable of forming the third layer, the inventors of the present invention used the cellulose ester, the polymer thereof, or the aromatic polymer as a material capable of directly forming the third layer on the first layer exhibiting low solvent resistance via the second layer without forming a bonding layer therebetween while providing the antireflection effect. Preferably, the third layer is formed of the cellulose ester or the polymer thereof.

The cellulose ester refers to a condensation product of a hydroxyl group on cellulose and a carboxyl group on carboxylic acid. The cellulose ester may be position-selectively or randomly substituted. Position selectivity may be measured by determining a relative degree of substitution at C6, C3 and C2 on the cellulose ester based on carbon-13 NMR spectra. The cellulose ester may be prepared by a typical method by bringing a cellulose solution into contact with at least one $C_1$ to $C_{20}$ acylation agent for a sufficient period of time to provide a cellulose ester having predetermined degrees of substitution and polymerization. Preferably, the acylation agent includes at least one $C_1$ to $C_{20}$ linear or branched alkyl aryl, a carboxylic acid anhydride, a carboxylic acid halide, a diketone, or an acetoacetic acid ester. Examples of the carboxylic acid anhydride may include acetic anhydride, propionic anhydride, butyric anhydride, isobutyric anhydride, valeric anhydride, hexanoic anhydride, 2-ethylhexanoic anhydride, nonanoic anhydride, lauric anhydride, palmitic anhydride, stearic anhydride, benzoic anhydride, substituted benzoic anhydride, phthalic anhydride, and isophthalic anhydride. Examples of the carboxylic acid halide may include acetyl, propionyl, butyryl, hexanoyl, 2-ethylhexanoyl, lauroyl, palmitoyl, benzoyl, substituted benzoyl, and stearoyl chloride. Examples of the acetoacetic acid ester may include methyl acetoacetate, ethyl acetoacetate, propyl acetoacetate, butyl acetoacetate, and tertiary butyl acetoacetate. More preferably, the acylation agent is a $C_2$ to $C_9$ linear or branched alkyl carboxylic anhydride, such as acetic anhydride, propionic anhydride, butyric anhydride, 2-ethylhexanoic anhydride, nonanoic anhydride, stearic anhydride, and the like.

Examples of the cellulose ester may include cellulose acetate (CA), cellulose acetate propionate (CAP), and cellulose acetate butyrate (CAB), without being limited thereto.

The third layer may further include an additive having an aromatic fused ring in addition to the cellulose ester, the polymer thereof, or the aromatic polymer. The additive may serve to regulate the Rth expression rate and wavelength dispersion of the positive C layer. The aromatic fused ring may include naphthalene, anthracene, phenanthrene, pyrene, the following structure 1, or the following structure 2. Examples of the additive may include 2-naphthyl benzoate, 2,6-naphthalene dicarboxylic acid diester represented by the following structure 3, naphthalene, and abietic acid esters represented by the following structure 4, without being limited thereto:

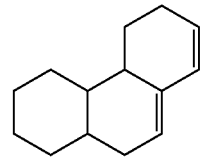

<Structure 1>

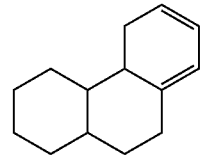

<Structure 2>

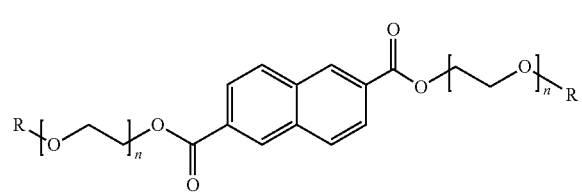

<Structure 3> wherein R is a $C_1$ to $C_{20}$ alkyl or a $C_6$ to $C_{20}$ aryl and n is an integer of 0 to 6.

<Structure 4>

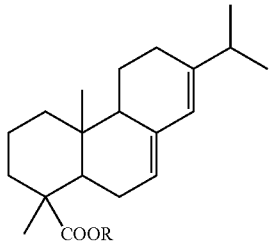

wherein R is a $C_1$ to $C_{20}$ alkyl or a $C_6$ to $C_{20}$ aryl.

The third layer may further include additives, such as a plasticizing agent, a stabilizer, a UV absorbent, an anti-blocking agent, a slip agent, a lubricant, a dye, a pigment, a retardation enhancer, and the like.

The composition for the third layer may include a particular solvent that can improve coatability of the composition and can erode the first layer exhibiting low solvent resistance to form the second layer, in addition to the cellulose ester, the polymer thereof or the aromatic polymer. The second layer is formed by eroding a portion of the surface of the first layer through deposition of the composition for the third layer on the surface of the first layer while securing phase retardation of the first layer acting as the negative dispersion negative A layer. Here, since the first layer has low solvent resistance, selection of a suitable solvent is an important issue.

The solvent for the composition for the third layer may be a mixture of at least two selected from among a ketone-based solvent, such as methyl isopropyl ketone (MIPK) and acetone, an ether-based solvent such as propylene glycol methyl ether (PGME), and propylene glycol methyl ether acetate (PGMEA).

In one embodiment, the solvent may be a mixture of a ketone-based solvent and an ether-based solvent. In the mixture, the ketone-based solvent may be present in an amount of about 40 wt % to about 70 wt %, preferably about 45 wt % to about 55 wt %, and the ether-based solvent may be present in an amount of about 30 wt % to about 60 wt %, preferably about 45 wt % to about 55 wt %. Within this range, the composition allows easy formation of the second layer, can secure good adhesive strength between the first layer and the third layer, and can ensure that the first layer can act as the negative dispersion negative A layer even upon erosion of the first layer.

Preferably, the solvent includes a mixture of methyl isopropyl ketone and propylene glycol methyl ether or a mixture of acetone and propylene glycol methyl ether. In the mixture, at least one of methyl isopropyl ketone and acetone may be present in an amount of about 40 wt % to about 70 wt %, preferably about 45 wt % to about 55 wt %. In the mixture, propylene glycol methyl ether may be present in an amount of about 30 wt % to about 60 wt %, preferably about 45 wt % to about 55 wt %. Within this range, the composition allows easy formation of the second layer, can secure good adhesive strength between the first layer and the third layer, and can ensure that the first layer can act as the negative dispersion negative A layer even upon erosion of the first layer.

In the composition for the third layer, a solid content may be in the range of about 0.1 wt % to about 20 wt %, preferably about 5 wt % to about 20 wt %, or about 9 wt % to about 15 wt %. Within this range, the composition allows easy formation of the second layer and the third layer while securing a uniform interface between the first layer and the second layer.

The optical film may further include an adhesive layer, a bonding layer, or an adhesive bonding layer formed on the other surface of the third layer, that is, on a surface of the third layer not directly contacting the second layer, to attach the optical film to an adherend, for example, an OLED panel, a liquid crystal panel, and the like.

The second layer may include the same kind of polymer as the first layer. Thus, the second layer may include at least one selected from among a polycarbonate resin, a cyclic olefin polymer resin, a modified polycarbonate resin, a fluorene resin, a polyester resin, an isosorbide resin, and a cellulose resin.

In one embodiment, the second layer may be a non-adhesive layer, a non-bonding layer, or a non-adhesive bonding layer.

Since the second layer is formed through erosion on the surface of the first layer by the composition for the third layer as described above, the second layer may exhibit different characteristics than the first layer. For example, the second layer may be different from the first layer in terms of alignment direction of polymers, alignment degree of polymers, and the like, as described above.

Since the second layer is formed through erosion on the surface of the first layer by the composition for the third layer as described above, an interface between the first layer and the second layer may be even or uneven.

The second layer may directly contact the first layer and the third layer, and may have a predetermined thickness. However, since the second layer is formed through erosion of the first layer, the second layer may have a different phase retardation than the first layer. In this case, the optical film can suffer from deterioration in antireflection effect due to reaction between the first layer and the third layer. However, the optical film according to the present invention can maximize adhesive strength between the first layer and the third layer through the second layer while minimizing influence on the antireflection effect.

A stack of the first layer and the second layer may act as a negative dispersion negative A layer. For example, the stack of the first layer and the second layer exhibits negative dispersion to satisfy a relation: nx≥ny≥nz. Within this range, the stack of the first layer and the second layer can exhibit the antireflection effect when coupled to the third layer.

The stack of the first layer and the second layer may have an in-plane retardation ratio (Re(450)/Re(550)) of about 0.7 to about 1.0, preferably about 0.7 to about 0.9, more preferably about 0.8 to about 0.9, where Re(550) indicates an in-plane retardation at a wavelength of 550 nm and Re(450) indicates an in-plane retardation thereof at a wavelength of 450 nm. Within this range, the stack of the first layer and the second layer can exhibit the antireflection effect when coupled to the third layer.

The stack of the first layer and the second layer may have an in-plane retardation ratio (Re(650)/Re(550)) of about 1.0 to about 1.4, preferably about 1.0 to about 1.1, where Re(650) indicates an in-plane retardation at a wavelength of 650 nm and Re(550) indicates an in-plane retardation thereof at a wavelength of 550 nm. Within this range, the stack of the first layer and the second layer can exhibit the antireflection effect when coupled to the third layer.

The stack of the first layer and the second layer may have an in-plane retardation Re(550) of about 110 nm to about 170 nm, preferably about 130 nm to about 155 nm, more preferably about 130 nm to about 140 nm, at a wavelength of 550 nm. Within this range, the stack of the first layer and the second layer can exhibit the antireflection effect when coupled to the third layer.

The stack of the second layer and the third layer may act as a positive C layer. For example, the stack of the second layer and the third layer satisfies a relation: nz>nx≈ny.

The stack of the second layer and the third layer may have an in-plane retardation of about 10 nm or less, preferably about 4 nm or less, at a wavelength of 550 nm. Within this range, the stack of the second layer and the third layer can exhibit the antireflection effect when coupled to the first layer.

The second layer may have a thickness of about 15 μm or less, preferably about 0.1 μm to about 15 μm, more preferably about 0.4 μm to about 3 μm, more preferably about 0.5 μm to about 2 μm. Within this range, the optical film can exhibit the antireflection effect.

The second layer may include the solvent included in the composition for the third layer, as described below. The solvent remains so as not to affect optical characteristics and phase retardation of the optical film, instead of being completely removed upon formation of the second layer and the third layer. For example, the second layer may include a solvent mixture of at least two selected from among a ketone-based solvent, such as methyl isopropyl ketone (MIPK) and acetone, an ether-based solvent such as propylene glycol methyl ether (PGME), and propylene glycol methyl ether acetate (PGMEA).

The optical film may have in-plane retardation Re(550) of about 110 nm to about 170 nm, preferably about 130 nm to about 155 nm, at a wavelength of 550 nm. Within this range, the optical film can exhibit the antireflection effect.

The optical film may have an out-of-plane retardation (or retardation in thickness direction) Rth of about 30 nm to about −60 nm, preferably about −10 nm to about −50 nm, at a wavelength of 550 nm. Within this range, the optical film can exhibit the antireflection effect and can have low lateral reflectivity for antireflection.

The optical film may have a degree of biaxiality NZ of about 0 to about 0.7, preferably about 0.1 to about 0.4, at a wavelength of 550 nm. Within this range, the optical film can exhibit the antireflection effect and can have low lateral reflectivity for antireflection.

Next, an optical film according to another embodiment will be described.

The optical film according to this embodiment is substantially the same as the optical film according to the above embodiment except that the optical film of this embodiment further includes a UV absorbent. Preferably, the third layer of the optical film includes the UV absorbent, whereby the optical film can suppress light transmittance at a wavelength of 400 nm to prevent damage to a display panel, for example, an organic light emitting device, due to external light. For example, the optical film or a polarizing plate including the same may have a light transmittance of about 3% or less, for example, about 1% or less, at a wavelength of 400 nm.

In one embodiment, the UV absorbent may have a maximum absorption wavelength of 380 nm to 420 nm, preferably 390 nm to 410 nm, more preferably 395 nm to 405 nm. According to the present invention, the UV absorbent may be selected from among any absorbent without limitation so long as the selected absorbent has the maximum absorption wavelength as set forth above. For example, the UV absorbent may include at least one selected from among indole, triazine, triazole, and benzophenone absorbents.

The UV absorbent may be present in an amount of about 0.1 wt % to about 2 wt %, preferably about 0.2 wt % to about 0.8 wt %, in the third layer. Within this range, the UV absorbent can prevent damage to a panel and deterioration in light transmittance.

Next, a method of manufacturing the optical film according to the embodiment will be described.

The method of manufacturing the optical film according to the present invention may include depositing a composition for the third layer to a predetermined thickness on one surface of the first layer.

A film for the first layer may include a film formed of the materials described above, that is, at least one selected from among a polycarbonate resin, a cyclic olefin polymer resin, a modified polycarbonate resin, a fluorine resin, a polyester resin, an isosorbide resin, and a cellulose resin.

The composition for the third layer may include the aforementioned material, that is, at least one selected from among a cellulose ester, a polymer thereof, and an aromatic polymer; and the aforementioned mixed solvent, that is, a mixture of at least two selected from among a ketone-based solvent, such as methyl isopropyl ketone (MIPK) and acetone, an ether-based solvent such as propylene glycol methyl ether (PGME), and propylene glycol methyl ether acetate (PGMEA). The composition for the third layer may further include an additive. In the composition for the third layer, the cellulose ester or the polymer thereof alone, or the aromatic polymer alone, or all of these components and the additive may be present in an amount of about 0.1 wt % to about 20 wt %, preferably about 9 wt % to about 15 wt %. Within this range, the composition for the third layer can exhibit good coatability and can secure the effects of the present invention. For example, these components may be present in an amount of about 0.1 wt %, 0.5 wt %, 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, or 20 wt %.

The composition for the third layer may be deposited to a predetermined thickness on the surface of the film for the first layer. For example, the composition for the third layer may be deposited to have a thickness of about 1 μm to about 10 μm, preferably about 3 μm to about 7 μm, in a dried state. The composition for the third layer may be deposited by any method well-known to those skilled in the art using a die coater, without being limited thereto.

The method of manufacturing the optical film according to the present invention may further include drying a layer deposited onto the first layer to remove a solvent after deposition of the composition for the third layer to a predetermined thickness. Although drying conditions differ according to the kind of solvent to be used, drying may be performed at about 30° C. to about 120° C., preferably about 40° C. to about 80° C. for about 1 min to about 20 min.

The method of manufacturing the optical film according to the present invention may further include performing light or heat treatment on the deposited layer after removal of the solvent.

Next, a polarizing plate according to the present invention will be described.

The polarizing plate according to the present invention may include a polarizing film and an optical film on at least one surface of the polarizing film. In one embodiment, the polarizing plate may include a polarizing film and an optical film formed on at least one surface of the polarizing film, wherein the optical film includes a first layer, a second layer and a third layer sequentially formed on the polarizing film. With this structure, the polarizing plate can have an antireflection effect with respect to external light to improve screen quality of a display apparatus when mounted on an OLED panel. In one embodiment, the polarizing plate may have a reflectivity of about 5% or less, for example, about 4.5% or less.

In one embodiment, the polarizing film may include a polarizer. Specifically, the polarizer may include a polyvinyl alcohol film obtained through uniaxial stretching of a polyvinyl alcohol film or a polyene-based polarizer obtained through dehydration of a polyvinyl alcohol film. The polarizer may have a thickness of about 5 µm to about 40 Within this thickness range, the polarizer can be used in a display apparatus.

In another embodiment, the polarizing film may further include a protective layer formed on at least one surface of the polarizer. The protective layer serves to protect the polarizer, thereby improving reliability and mechanical strength of the polarizing plate.

The protective layer may include at least one of an optically transparent protective film or a protective coating layer. The protective film may include a film formed of at least one selected from among cellulose ester resins including triacetylcellulose (TAC), cyclic polyolefin resins including amorphous cyclic olefin polymer (COP), polycarbonate resins, polyester resins including polyethylene terephthalate (PET), polyether sulfone resins, polysulfone resins, polyamide resins, polyimide resins, non-cyclic polyolefin resins, poly(meth)acrylate resins including a poly(methyl methacrylate) resin, polyvinyl alcohol resins, polyvinyl chloride resins, and polyvinylidene chloride resins, without being limited thereto. The protective coating layer may be formed of an actinic radiation-curable resin composition including an actinic radiation-curable compound and a polymerization initiator. The actinic radiation-curable compound may include at least one of a cationic polymerizable curable compound, a radical polymerizable curable compound, a urethane resin, and a silicone resin.

The polarizing plate may further include a functional coating layer on the other surface of the polarizing film. The functional coating layer may include at least one selected from among a primer layer, a hard coating layer, an antifingerprint layer, an antireflection layer, an anti-glare layer, a low reflectivity layer, and an ultra-low reflectivity layer, without being limited thereto.

The optical film may be directly formed on the polarizing film. That is, the optical film may be stacked on the polarizing film to contact the polarizing film without an adhesive layer, a bonding layer, or an adhesive bonding layer.

The optical film may be stacked on the polarizing film via an adhesive layer, a bonding layer, or an adhesive bonding layer. The adhesive layer, the bonding layer, or the adhesive bonding layer may be formed of a typical pressure-sensitive adhesive well-known to those skilled in the art, without being limited thereto.

FIG. 1 is a sectional view of a polarizing plate according to one embodiment of the present invention.

Referring to FIG. 1, the polarizing plate may include a polarizer 10, a first protective layer 20 formed on an upper surface of the polarizer 10, a second protective layer 30 formed on a lower surface of the polarizer 10, and an optical film 40, which includes a first layer 41, a second layer 42, and a third layer 43 sequentially formed on a lower surface of the second protective layer 30.

Although not shown in FIG. 1, an adhesive layer is formed between the second protective layer and the first layer to attach the second protective layer to the first layer. Although not shown in FIG. 1, an adhesive layer may be formed on a lower surface of the third layer.

FIG. 2 is a sectional view of a polarizing plate according to another embodiment of the present invention.

Referring to FIG. 2, the polarizing plate may include a polarizer 10, a first protective layer 20 formed on an upper surface of the polarizer 10, and an optical film 40, which includes a first layer 41, a second layer 42, and a third layer 43 sequentially formed on a lower surface of the polarizer 10.

Although not shown in FIG. 2, an adhesive layer is formed between the polarizer and the first layer to attach the polarizer to the first layer. Although not shown in FIG. 2, an adhesive layer may be formed on a lower surface of the third layer.

Next, a display apparatus according to the present invention will be described.

The display apparatus according to the present invention may include at least one of the optical film or the polarizing plate according to the present invention. In one embodiment, the display apparatus may include a liquid crystal display and a light emitting diode display, preferably a light emitting diode display. The light emitting diode display includes an organic light emitting diode display or an organic/inorganic light emitting diode display. For example, the light emitting diode display may refer to a light emitting diode display that includes a light emitting diode (LED), an organic light emitting diode (OLED), a quantum dot light emitting diode (QLED), and a light emitting material, such as phosphors.

MODE FOR INVENTION

Next, the present invention will be described in more detail with reference to examples. However, it should be noted that these examples are provided for illustration only and should not be construed in any way as limiting the invention.

Example 1

As a film for the first layer, a negative dispersion negative A film (Konica Minolta, Re=145 nm at a wavelength of 550 nm, Re(450)/Re(550)=0.82) was used. The film for the first layer has an Re of 145 nm at a wavelength of 550 nm before evaluation of solvent resistance and an Re of 140 nm at a wavelength of 550 nm Re after evaluation of solvent resistance. Solvent resistance was evaluated as described above.

A composition for the third layer having a solid content as listed in Table 1 was prepared by evenly mixing VM (Eastman Inc., cellulose acetate) and a solvent as listed in Table 1. Here, the "solid content" means a weight ratio of the VM to the composition for the third layer.

A polarizer (thickness: 12 µm) was prepared by stretching a polyvinyl alcohol film to three times an initial length thereof at 60° C. and adsorbing iodine to the stretched film, followed by stretching the film to 2.5 times in a boric acid solution at 40° C. A triacetylcellulose (TAC) film (KC2UAW, Konica Minolta Opto Inc.) was attached to one surface of the polarizer and the film for the first layer was bonded to the other surface thereof.

Thereafter, the composition for the third layer was coated to a thickness of 50 µm on the other surface of the film for the first layer and dried (or cured) at 60° C. for 3 minutes to form the third layer having a thickness of 5 thereby preparing a polarizing plate including a TAC film/polarizer/first layer/second layer/third layer stack. The following Table 1 shows the thicknesses of the first layer, the second layer and the third layer of the optical film. The third layer was a positive C layer.

Example 2

A composition for the third layer having a solid content as listed in Table 1 was prepared by evenly mixing VM (Eastman Inc., cellulose acetate) and a solvent as listed in Table 1.

Thereafter, a polarizing plate including a TAC film/polarizer/first layer/second layer/third layer stack was prepared by the same method as in Example 1.

Example 3

A composition for the third layer having a solid content as listed in Table 1 was prepared by evenly mixing VM (Eastman Inc., cellulose acetate) and a solvent as listed in Table 1.

The composition for the third layer was coated to a thickness of 50 μm on one surface of the film for the first layer of Example 1 and dried (or cured) at 60° C. for 3 minutes to form the third layer having a thickness of 5.2 μm, thereby preparing an optical film including the second layer and the third layer sequentially formed on the first layer.

A polarizer (thickness: 12 μm) was prepared by stretching a polyvinyl alcohol film to three times an initial length thereof at 60° C. and adsorbing iodine to the stretched film, followed by stretching the resulting film to 2.5 times in a boric acid solution at 40° C.

Triacetylcellulose (TAC) films (KC2UAW, Konica Minolta Opto Inc.) were bonded to upper and lower surfaces of the polarizer to form protective layers thereon. The prepared optical film was attached to the other surface of the TAC film via a pressure sensitive adhesive (PSA) to form a polarizing plate including a TAC film/polarizer/TAC film/first layer/second layer/third layer stack.

Comparative Examples 1, 2 and 4

Compositions for the third layer each having a solid content as listed in Table 2 were prepared by evenly mixing VM (Eastman Inc., cellulose acetate) and a solvent as listed in Table 2.

Thereafter, a polarizing plate including a TAC film/polarizer/first layer/second layer/third layer stack was prepared by the same method as in Example 1.

Comparative Example 3

A composition for the third layer having a solid content as listed in Table 2 was prepared by evenly mixing VM (Eastman Inc., cellulose acetate) and a solvent as listed in Table 2.

The composition for the third layer was coated to a thickness of 50 μm on one surface of the film for the first layer of Example 1 and dried (or cured) at 60° C. for 3 minutes to form the third layer having a thickness of 5 μm, thereby preparing an optical film including the second layer and the third layer sequentially formed on the first layer.

A polarizer (thickness: 12 μm) was prepared by the same method as in Example 1. Triacetylcellulose (TAC) films (KC2UAW, Konica Minolta Opto Inc.) were bonded to upper and lower surfaces of the polarizer to form protective layers thereon. The prepared optical film was attached to the other surface of the TAC film via a pressure sensitive adhesive (PSA) to form a polarizing plate including a TAC film/polarizer/TAC film/first layer/second layer/third layer stack.

Comparative Example 5

A composition for the third layer having a solid content as listed in Table 2 was prepared by evenly mixing VM (Eastman Inc., cellulose acetate) and a solvent as listed in Table 2. The composition for the third layer was coated to a thickness of 50 μm on one surface of a release film and subjected to drying and curing to form a third layer having a thickness as listed in Table 2.

A polarizer was prepared by the same method as in Example 1.

A triacetylcellulose (TAC) film (KC2UAW, Konica Minolta Opto Inc.) was bonded to one surface of the polarizer, and a triacetylcellulose (TAC) film (KC2UAW, Konica Minolta Opto Inc.) and a film for the first layer were sequentially bonded to the other surface of the polarizer. The prepared third layer was bonded to the other surface of the film for the first layer via a pressure sensitive adhesive (PSA), thereby preparing a polarizing plate including a TAC film/polarizer/TAC film/first layer/third layer stack.

Comparative Example 6

A polarizer was prepared by the same method as in Example 1. Triacetylcellulose (TAC) films (KC2UAW, Konica Minolta Opto Inc.) were bonded to upper and lower surfaces of the polarizer, thereby preparing a polarizing plate including a TAC film/polarizer/TAC film stack.

The optical films and the polarizing plates prepared in Examples and Comparative Examples were evaluated as to the following properties as listed in Tables 1 and 2.

(1) Light transmittance: Light transmittance at a wavelength of 380 nm to 780 nm was measured on the polarizing plates of Examples and Comparative Examples using a V7100 (JASCO).

(2) Adhesive strength: Adhesive strength was evaluated on the optical film of each of the polarizing plates of Examples and Comparative Examples. Each of the optical films was cut into a square shape having a size of 10 cm×10 cm (length×width) and an adhesive tape (Ichibang, Nitto Co., Ltd.) was attached to the third layer of the optical film. The optical film was cut to a depth of the first layer so as to form 10 lines in the transverse direction and 10 lines in the longitudinal direction, thereby preparing 100 specimens. Among the 100 specimens, the number of specimens detached together with the adhesive tape was counted upon separation of the adhesive tape from the optical film. As adhesive strength between the first layer and the third layer increases, the number of detached specimens decreases.

(3) In-plane retardation of first layer: In-plane retardation at a wavelength of 550 nm was measured on the first layer of the optical film in each of the polarizing plates prepared in Examples and Comparative Examples using an Axoscan.

(4) Reflectivity: Each of the polarizing plates prepared in Examples and Comparative Examples was coupled to an OLED panel and evaluated as to lateral reflectivity at an angle of 60° corresponding to an angle of incidence using an EZ-contrast three-dimensional measurement instrument (Eldim, French). A lower reflectivity indicates higher antireflection performance.

TABLE 1

|  | Example | | | Comparative |
|---|---|---|---|---|
| Item | 1 | 2 | 3 | Example 6 |
| Solvent | Mixed solvent of MIPK (50 wt %) and PGME (50 wt %) | Mixed solvent of MIPK (50 wt %) and PGME (50 wt %) | Mixed solvent of acetone (50 wt %) and PGME (50 wt %) | — |
| Solid content (wt %) | 10 | 12 | 12 | — |
| Thickness of first layer (μm) | 50 | 50 | 50 | — |
| Thickness of second layer (μm) | 2.4 | 3 | 2 | — |
| Thickness of third layer (μm) | 5 | 5 | 5.2 | — |
| Thickness ratio | 0.48 | 0.6 | 0.38 | — |
| Light transmittance (%) | 42.49 | 42.51 | 42.30 | 42 |
| Adhesive strength | 0 specimens | 0 specimens | 0 specimens | — |
| Optical axis of first layer (°) | 45 | 45 | 0 | — |
| In-plane retardation of first layer (nm) | 138 | 136 | 138 | — |
| Re(450)/Re(550) of first layer | 0.82 | 0.82 | 0.82 | — |
| Reflectivity (%) | 4.20 | 4.0 | 4.25 | 80 |

*Thickness ratio: Thickness ratio of second layer to third layer in optical film

TABLE 2

|  | Comparative Example | | | | | |
|---|---|---|---|---|---|---|
| Item | 1 | 2 | 3 | 4 | 5 | 6 |
| Solvent | MEK | Mixed solvent of MEK (50 wt %) and PGME (50 wt %) | Mixed solvent of MIPK(80 wt %) and PGME (20 wt %) | Ethanol | PGME | — |
| Solid content (wt %) | 10 | 10 | 10 | 10 | 10 | — |
| Thickness of first layer (μm) | 10 | 35 | 40 | 35 | 50 | — |
| Thickness of second layer (μm) | 35 | 15 | 12 | 0.5 | 0 | — |
| Thickness of third layer (μm) | 5 | 5 | 5 | 5 | 5 | — |
| Thickness ratio | 7 | 3 | 2.4 | 0.1 | — | — |
| Light transmittance (%) | 41 | 41 | 41.5 | 15 | 15 | 42 |
| Adhesive strength | 0 specimens | 0 specimens | 0 specimens | 85 specimens | 95 specimens | — |
| Optical axis of first layer (°) | 45 | 45 | 0 | 45 | 0 | — |
| In-plane retardation of first layer (nm) | 20 | 100 | 125 | 140 | 138 | — |
| Re(450)/Re(550) of first layer | 0.82 | 0.82 | 0.82 | 0.82 | 0.82 | — |
| Reflectivity (%) | 70 | 25.5 | 7.50 | — | — | 80 |

*Thickness ratio: Thickness ratio of second layer to third layer in optical film As shown in Table 1, the optical films according to the present invention and the polarizing plates including the same exhibited good interlayer adhesive strength and the first layer of each of the optical films acted as a negative dispersion negative A layer to have a ¼ phase retardation, thereby securing low reflectivity and high antireflection performance. In addition, the optical films according to the present invention and the polarizing plates including the same had higher light transmittance than the polarizing plate of Comparative Example 6, which was prepared without an optical film.

On the contrary, the polarizing plates of Comparative Examples 1 to 4, which had thickness ratios out of the range of the present invention, exhibited low interlayer adhesive strength or high reflectivity, and had lower light transmittance than the polarizing plate of Comparative Example 6. In addition, the polarizing plate of Comparative Example 5 in which the third layer was attached to the first layer via the adhesive without the second layer therebetween had low light transmittance and low interlayer adhesive strength.

It should be understood that various modifications, changes, alterations, and equivalent embodiments can be made by those skilled in the art without departing from the spirit and scope of the present invention.

The invention claimed is:

1. An optical film comprising:
a first layer; and
second and third layers sequentially formed on the first layer,
wherein each of the first layer and the third layer is directly formed on the second layer, the first layer being a negative dispersion negative A layer, the third layer being a positive C layer, and a thickness ratio of the second layer to the third layer (thickness of the second layer/thickness of the third layer) ranges from about 0.2 to about 2, wherein the third layer comprises a cellulose ester comprising at least one selected from among cellulose acetate, cellulose acetate propionate, and cellulose acetate butyrate.

2. The optical film according to claim 1, wherein the third layer is a non-crystal layer.

3. The optical film according to claim 1, wherein the second layer is a non-adhesive layer, a non-bonding layer, or a non-adhesive bonding layer and is formed through erosion of the first layer.

4. The optical film according to claim 1, wherein the first layer and the second layer comprise the same kind of polymer and have at least one of a different alignment direction of polymers or a different alignment degree of polymers from one another.

5. The optical film according to claim 4, wherein the first layer has a higher alignment degree of polymers than the second layer.

6. The optical film according to claim 4, wherein the first layer comprises the polymers aligned in a mono-axial direction or in a bi-axial direction, and the second layer comprises the polymers not in an aligned state.

7. The optical film according to claim 1, wherein the first layer has an in-plane retardation ratio (Re (450)/Re (550)) of about 0.7 to about 1.0, where Re (550) indicates an in-plane retardation at a wavelength of 550 nm and Re (450) indicates an in-plane retardation at a wavelength of 450 nm.

8. The optical film according to claim 1, wherein the first layer has an in-plane retardation Re (550) of about 110 nm to about 170 nm at a wavelength of 550 nm.

9. The optical film according to claim 1, wherein the first layer is formed of at least one selected from among a polycarbonate resin, a cyclic olefin polymer resin, a modified polycarbonate resin, an isosorbide resin, a cellulose resin, a fluorene resin, and a polyester resin.

10. The optical film according to claim 1, wherein the first layer has an in-plane retardation variation of about 5 nm or more, as represented by Equation 1:

$$\text{In-plane retardation variation} = |Re[0] - Re[1]|, \quad \text{[Equation 1]}$$

wherein Equation 1,
Re[0] is an in-plane retardation Re (unit: nm) of the first layer, as measured on a specimen having a size of 3 cm×3 cm×50 μm at a wavelength of 550 nm, and
Re[1] is an in-plane retardation Re (unit: nm) of the first layer, as measured on the specimen at a wavelength of 550 nm after one drop of methylethylketone is added to the specimen at 25° C. and left for 1 hour.

11. The optical film according to claim 1, wherein the second layer has a thickness of about 15 μm or less.

12. The optical film according to claim 1, wherein the third layer has a thickness of about 15 μm or less.

13. The optical film according to claim 1, wherein a stack of the first layer and the second layer is a negative dispersion negative A layer.

14. The optical film according to claim 1, wherein a stack of the first layer and the second layer has an in-plane retardation Re (550) of about 110 nm to about 170 nm at a wavelength of 550 nm.

15. The optical film according to claim 1, wherein a stack of the second layer and the third layer is a positive C layer.

16. The optical film according to claim 1, wherein, assuming that a machine direction (MD) of the first layer is 0°, the first layer has a slow axis in the range of about −5° to about 5° or about 40° to about 50° with respect to the machine direction (MD) of the first layer.

17. The optical film according to claim 1, wherein the third layer further comprises a UV absorbent having a maximum absorption wavelength of about 380 nm to about 420 nm.

18. The optical film according to claim 17, wherein the UV absorbent is present in an amount of about 0.1 wt % to about 2 wt % in the third layer.

19. The optical film according to claim 1, further comprising: an adhesive layer, a bonding layer, or an adhesive bonding layer on an outermost surface thereof.

20. A polarizing plate comprising: a polarizing film and the optical film according to claim 1 formed on one surface of the polarizing film.

21. The polarizing plate according to claim 20, wherein the first layer, the second layer, and the third layer are sequentially formed on the polarizing film.

22. The polarizing plate according to claim 20, comprising: a first protective layer; a polarizer; a second protective layer; the first layer; the second layer; and the third layer sequentially formed in the stated order.

23. The polarizing plate according to claim 20, comprising: a first protective layer; a polarizer; the first layer; the second layer; and the third layer sequentially formed in the stated order.

24. A display apparatus comprising the optical film according to claim 1.

* * * * *